United States Patent
Dive

(10) Patent No.: US 6,836,851 B2
(45) Date of Patent: Dec. 28, 2004

(54) TWO-STEP SYNCHRONIZATION METHOD IN WHICH TWO MODULES ARE SYNCHRONIZED FIRST BY FREQUENCY FOLLOWED BY A SYNCHRONIZATION IN PHASE

(75) Inventor: Geoffrey Dive, Annapolis, MD (US)

(73) Assignee: Alcatel, Paris (FR)

( * ) Notice: Subject to any disclaimer, the term of this patent is extended or adjusted under 35 U.S.C. 154(b) by 591 days.

(21) Appl. No.: 09/810,250

(22) Filed: Mar. 19, 2001

(65) Prior Publication Data

US 2002/0007465 A1 Jan. 17, 2002

(30) Foreign Application Priority Data

Mar. 20, 2000 (DE) .......................................... 100 13 313

(51) Int. Cl.$^7$ ................................................ G06F 1/12
(52) U.S. Cl. ........................ 713/400; 713/401; 370/350
(58) Field of Search ................................ 713/400, 401; 370/350

(56) References Cited

U.S. PATENT DOCUMENTS 6,014,376 A * 1/2000 Abreu et al. ................. 370/350
6,373,834 B1 * 4/2002 Lundh et al. ................ 370/350

* cited by examiner

*Primary Examiner*—Thomas Lee
*Assistant Examiner*—Pranav Chandrasekhar
(74) *Attorney, Agent, or Firm*—Sughrue Mion, PLLC

(57) ABSTRACT

The present invention relates to a method for the synchronization of a first and a least one second module, each having a clock generator. The invention furthermore relates to such modules, a master program module, a slave program module and a device for this purpose. It is proposed that the first module, transmits a first clock signal generated by its clock generator to the second module, which synchronizes its clock generator with the first clock signal. The second module transmits a second clock signal generated by its clock generator that is synchronized with the first clock signal to the first module, which determines a time difference value between the first clock signal and the second clock signal, which time difference value is essentially due the transmission time of the first and the second clock signal between the first and the second module. The first module transmits an item of information about the (first) time difference value to the second module, which adjusts its clock generator on the basis of said information.

19 Claims, 3 Drawing Sheets

Figure 1:
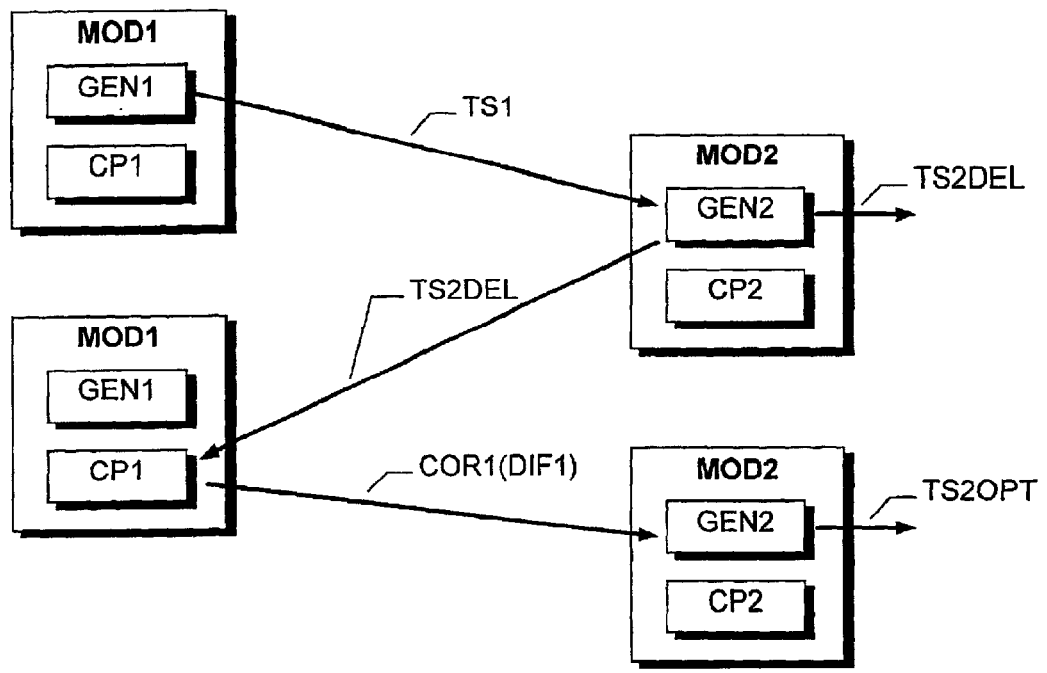

TWO-STEP SYNCHRONIZATION METHOD IN WHICH TWO MODULES ARE SYNCHRONIZED FIRST BY FREQUENCY FOLLOWED BY A SYNCHRONIZATION IN PHASE

FIELD OF THE INVENTION

The present invention relates to a method for synchronization of a first and at least a second module, each having a clock generator.

BACKGROUND OF THE INVENTION

In the field of telecommunication and of computer technology, the assemblies of an appliance that are needed for operation can frequently not be disposed on one electronic printed circuit board, but have to be distributed over a plurality of separate modules each having one or more printed circuit boards. In the case of telecommunication systems, in particular, redundant modules are also used for fail-safe reasons. So that the modules operate synchronously, the modules are supplied with a central timing signal, also known as "clock signal". Such a central clock signal is generated by a central clock generator and transmitted to the modules. Provided for the transmission is, for example, a clock channel in a bus to which the modules are connected. The modules operate either directly with the clock signal picked up from the bus or synchronize a separate, local clock generator, present on the respective module, to the central clock signal. In the latter case the local clock generators each generate local clock signals that are slightly phase-shifted in relation to the central clock signal, which shift is due to the transit time of the central clock signal on the bus.

In the case of high-precision appliances operating at high clock frequency, for example in the case of so-called cross connects in the SDH transmission technique (SDH= synchronous digital hierarchy), this phase shift already has an interfering effect on the precision of the appliance. The modules of an appliance then no longer operate with adequate synchronism and, for example, data is overtaken in the messages that the modules exchange with one another via the abovementioned bus.

Even if software modules are to interact under real-time conditions that are managed in each case by separate operating systems each having a local clock generator, a disturbing asynchronism may occur in the distribution of a central clock signal to the respective operating systems as a result of the transit time of the central clock signal.

The object of the invention is therefore to synchronize with high precision modules that each have a local clock generator.

SUMMARY OF THE INVENTION

This object is achieved by a method for synchronization of a first and at least a second module, each having a clock generator, the method comprising the steps of
- transmitting by the first module, a first clock signal generated by its clock generator to the at least one second module,
- synchronizing the clock generator of the at least one second module with the first clock signal,
- transmitting by the at least one second module a second clock signal generated by the clock generator that is synchronized with the first clock signal to the first module,
- determining by the first module, a (first) time difference value between the first clock signal and the at least one second clock signal, which time difference value is essentially due to the transmission time of the first and the at least one second clock signal between the first, and the at least one second module,
- transmitting by the first module, an item of information about the (first) time difference value to the at least one second module and
- adjusting the clock generator of the at least one second module on the basis of the information about the (first) time difference value.

In another aspect of the invention, this object is achieved by a (first) module having a first clock generator for synchronization with at least one second module having a second clock generator, comprising
- transmitting means for transmitting a first clock signal generated by the first clock generator to the at least one second module
- receiving means for receiving at least one second clock signal generated by the respective second clock generator and synchronized with the first clock signal and transmitted by the at least one second module, and
- generating means for forming a (first) time difference value between the first clock signal and the at least one second clock signal, which time difference value is essentially due to the transmission time of the first and of the at least one second clock signal between the first, and the at least one second module,
wherein the transmitting means are designed for sending an item of information about the (first) time difference value to the at least one second module.

In another aspect of the invention, this object is achieved by a (second) module having a clock generator for synchronization with at least one first module, comprising
- receiving means for receiving a first clock signal sent by the first module,
- synchronizing means for synchronizing its clock generator on the basis of the first clock signal, and
- transmitting means for sending a second clock signal synchronized with the first clock signal to the first module,
wherein the receiving means are designed for receiving an item of information sent by the first module about a (first) time difference value formed from the first clock signal and the second clock signal, which time difference value is essentially due to the transmission time of the first and of the at least one second clock signal between the first, and the at least one second module, and wherein the synchronizing means are designed for adjusting the clock generator on the basis of the information about the (first) time difference value.

In yet another aspect of the invention, the object is achieved by a master program module for a (first) module having a first clock generator for synchronization with at least one second module having a second clock generator, wherein the master program module contains a program code that can be run by a control means of the first module, the master program module further comprising
- transmitting means for sending a first clock signal generated by the first clock generator to the at least one second module,
- receiving means for receiving at least one second clock signal generated by the second clock generator that is synchronized with the first clock signal and sent by the at least one second module, and generating means for forming a (first) time difference value between first clock signal and the at least one second clock signal, which time difference value is essentially due to the transmission time of the first and of the at least one second clock generator between the first, and the at least one second module, wherein the transmitting means are designed for sending an item of information about the (first) time difference value to the at least one second module.

In yet another aspect of the invention, the object is achieved by a slave program module for a (second) module having a clock generator for synchronization with at least one first module, wherein the slave program module contains a program code that can be run by a control means of the second module, the slave program module further comprising receiving means for receiving a first clock signal sent by the first module, synchronizing means for synchronizing the clock generator on the basis of the first clock signal, and transmitting means for sending a second clock signal synchronized with the first clock signal to the first module, wherein the receiving means are designed to receive an item of information transmitted by the first module about a (first) time difference value formed from the first clock signal and the second clock signal, which time difference value is essentially due to the transmission time of the first and of the at least one second clock signal between the first, and the at least one second module, and wherein the synchronizing means are designed to adjust the clock generator on the basis of the information about the (first) time difference value.

In yet another aspect of the invention, the object is achieved by a device, in particular a telecommunication device, containing at least one first and at least one second module, each having a clock generator, wherein the at least one first module comprises transmitting means for transmitting a first clock signal generated by the first clock generator to the at least one second module.

receiving means for receiving at least one second clock signal generated by the respective second clock generator and synchronized with the first clock signal and transmitted by the at least one second module, and generating means for forming a (first) time difference value between the first clock signal and the at least one second clock signal, which time difference value is essentially due to the transmission time of the first and of the at least one second clock signal between the first and the at least one second module, wherein the transmitting means are designed for sending an item of information about the (first) time difference value to the at least one second module and wherein the at least one second module comprises receiving means for receiving a first clock signal sent by the first module, synchronizing means for synchronizing its clock generator on the basis of the first clock signal, and transmitting means for sending a second clock signal synchronized with the first clock signal to the first module, wherein the receiving means are designed for receiving an item of information sent by the first module about a (first) time difference value formed from the first clock signal and the second clock signal, which time difference value is essentially due to the transmission time of the first and of the at least one second clock signal between the first and the at least one second module, and wherein the synchronizing means are designed for adjusting the clock generator on the basis of the information about the (first) time difference value.

In this connection, the invention is based on the idea that a first module, referred to for simplicity as master module transmits a "master clock signal" generated by its clock generator to a module, referred to below as slave module for simplicity, and possibly to further slave modules. The slave modules then synchronize their respective clock generators to the master clock signal and transmit "slave clock signals" generated by the now synchronized clock generators to the master module. The master module consequently receives a feedback for its synchronization. The master module then determines a time difference value between the master clock signal and the respective slave clock signal. This time difference is essentially due to the signal transit time necessary for the transmission of the master clock signal to the respective slave module and to the signal transit time needed for the transmission of the respective slave clock signal from the respective slave module to the master module. Normally, both signal transit times are equally long because of the symmetrical transmission paths between master module and slave module, with the result that the respective time difference value represents roughly half the signal transit time. The master module then transmits items of information about the respective time difference values to the slave module or slave modules, which adjust their clock generator on the basis of these items of information. The phase differences between master clock signal and the slave clock signals that are due to the respective signal transit times of the master clock signal to the slave modules are consequently reduced to an extent that is no longer troublesome and, under optimum conditions, are completely eliminated, with the result that the master module and the slave modules are optimally synchronized with one another.

Further advantageous refinements of the invention emerge from the dependent claims.

In a preferred embodiment of the invention, either the master module or the slave modules halves/half the respective time difference value to determine the signal transit time and, consequently, the respective phase difference between master clock signal and slave clock signal to be corrected. If equally long signal transit times between master module and slave module are not involved, for example because of different transmission paths, more elaborate algorithms can be used to determine the respective phase difference to be corrected.

The master module may transmit the master clock signal continuously or, alternatively, only at predetermined time instants to the slave modules, for example in a cyclically recurring manner, only once, for example, in connection with a start synchronization procedure, or at irregular intervals, for example in times of low load on the master module and/or on the slave modules.

In a further variant of the invention, the slave modules repeatedly transmit their respective slave clock signals to the master module, with the result that the latter can determine time difference values between the master clock signal and the respective slave clock signal and is thus able to monitor the synchronous operation of the slave modules with the master module. If a slave clock signal of a slave module is asynchronous with the master clock signal, the master module can again send a correction value to the respective slave module to adjust its, respective clock generator.

Expediently, the master module repeatedly transmits the master clock signal to the slave modules again so that the latter are able to determine, in one variant of the invention, time difference values between their respective slave clock signal and the master clock signal. This then results in various possibilities:

The slave modules transmit the respective time difference values to the master module so that the latter can monitor the success of a synchronization procedure or can determine deviations possibly occurring during operation between master clock signal and the respective slave clock signals. The master module can then optionally start the above-described synchronization procedure again to synchronize the slave clock signals.

The slave modules can, however, also adjust their respective clock generators on their own initiative on the basis of the time difference values they have determined.

Figure 2:
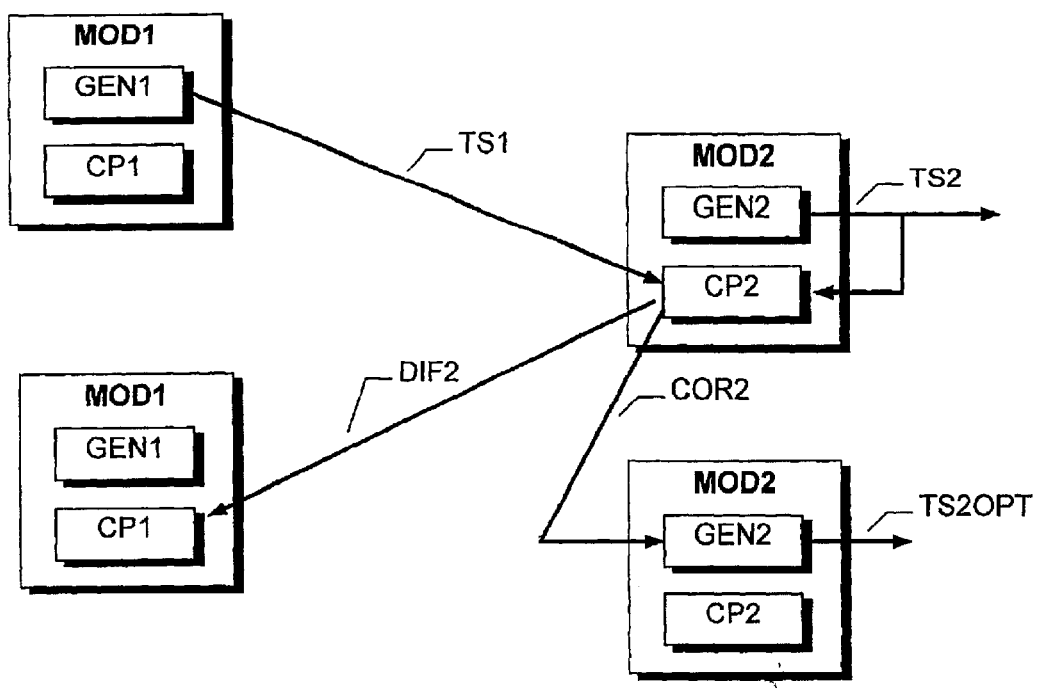
Figure 3:
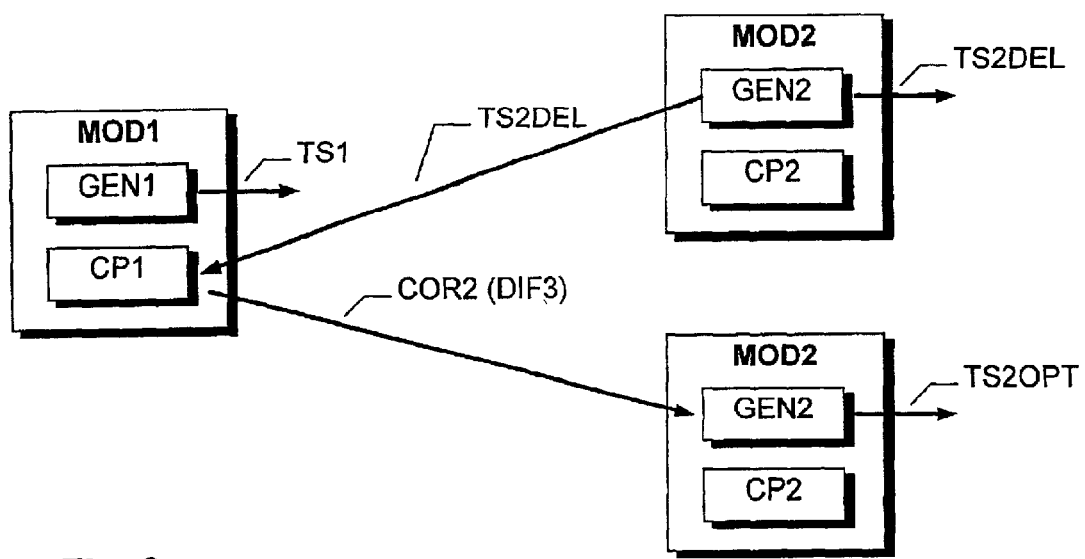
Figure 4:
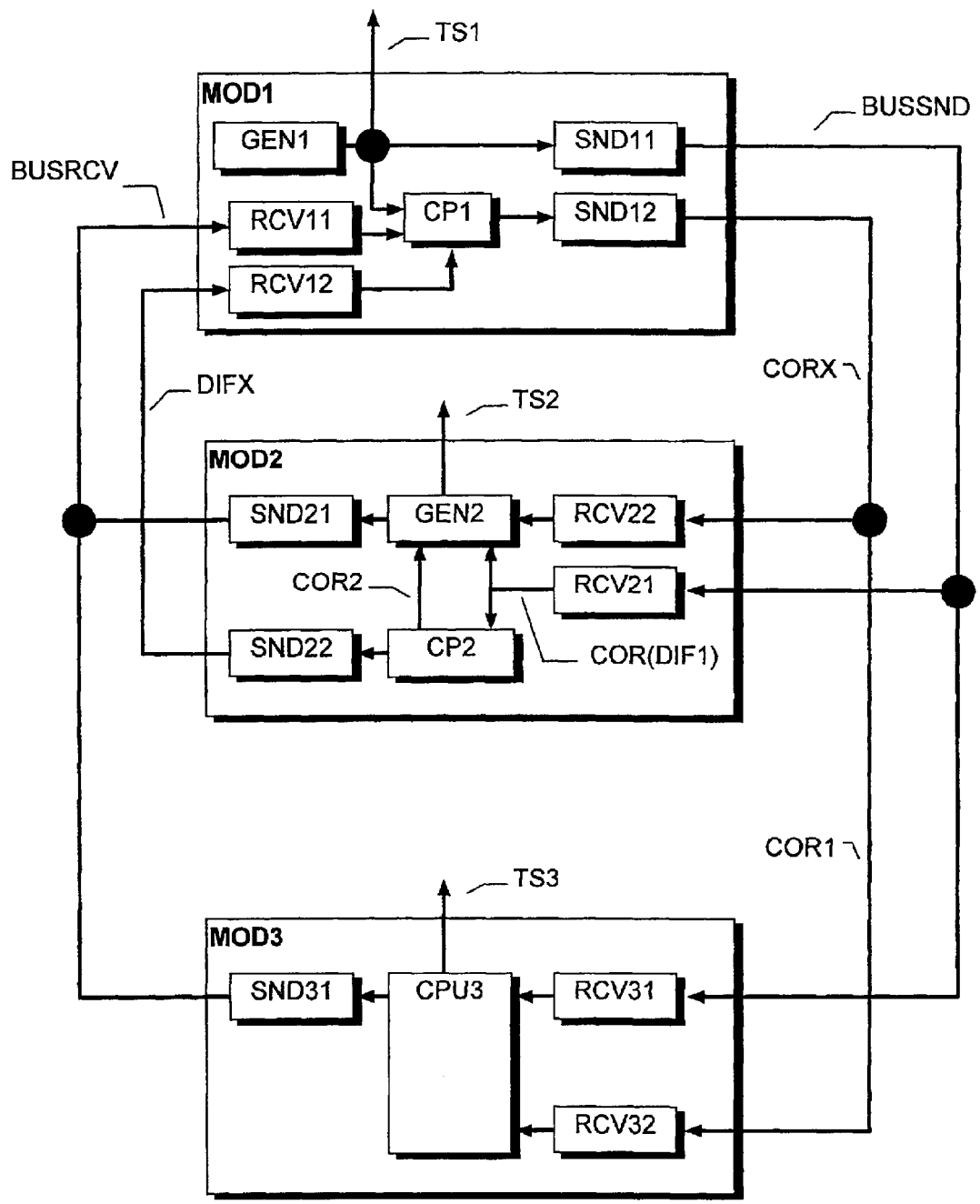

The invention is explained below on the basis of exemplary embodiments with the aid of the figures. In the figures:

FIG. 1 shows a sequence of a synchronization according to the invention on the basis of diagrammatically shown modules MOD1 and MOD2 according to the invention, FIG. 2 shows monitoring of the synchronization and a resynchronization subsequent to the synchronization in FIG. 1, FIG. 3 shows a supplementary or alternative solution to FIG. 2, that is to say monitoring of the synchronization and a resynchronization, likewise subsequent to the synchronization in FIG. 1, FIG. 4 shows an arrangement for performing the method according to the invention.

DETAILED DESCRIPTION OF THE INVENTION

FIG. 1 shows a sequence of a synchronization according to the invention on the basis of diagrammatically shown modules MOD1 and MOD2 according to the invention. To clarify the synchronization sequence, the modules MOD1 and MOD2 are each shown in duplicate. The modules MOD1 and MOD2 are, for example, electronic printed circuit boards of a computer system or of a telecommunication junction, for example a SDH cross connect (SDH synchronous digital hierarchy). The modules MOD1 and MOD2 are interconnected via a bus, which is not shown and on which the modules MOD1 and MOD2 can send one another items of information. The transmitting and receiving modules necessary for this purpose are explained in greater detail in FIG. 4. The modules MOD1 and MOD2 may also be software modules that each synchronize, for example, a local operating system.

A clock generator GEN1 and a logic component CP1 are shown in the module MOD1 and a clock generator GEN2 and a logic component CP2 in the module MOD2. The clock generators GEN1 and GEN2 each contain, for example, a quartz oscillator for generating a basic clock signal and a downstream electronic system, for example having a resettable counter, for generating an initial clock signal from the basic clock signal. Such circuits are known per se. The clock generator GEN1 generates, in this way, a clock signal TS1 and the clock generator GEN2 generates a clock signal TS2. The logic components CP1 and CP2 each comprise a comparator assembly for determining a phase difference between two clock signals and a generating assembly for forming a correction value with which the clock generator GEN2 can be adjusted. The logic components CP1 and CP2 may, for example, be signal processors or integrated circuits. The modules MOD1 and MOD2 may also comprise further functional assemblies, for example transmitters and/or receiving assemblies for transmitting and receiving user data telegrams, for example from SDH containers. Furthermore, the modules MOD1 and MOD2 and their functional components may be implemented as a whole by a processor that has a built-in clock generator and runs a program code of program modules according to the invention.

At the beginning of synchronization, the module MOD1 transmits the clock signal TS1 generated by its clock generator GEN1 to the module MOD2. The latter synchronizes its clock generator GEN2 with the clock signal TS1. Because, however, a certain transmission time is necessary for the transmission of the clock signal TS1 from the module MOD1 to the module MOD2 and, in addition, the operation of synchronizing the clock generator GEN2 also requires a certain processing time, the clock signal TS2DEL now generated by the clock generator GEN2 has a phase difference with respect to the clock signal TS1.

The module MOD2 transmits the clock signal TS2DEL to the module MOD1. Transmission time is likewise needed for this purpose. The module MOD1 determines a time difference value DIF1 between the clock signal TS1 and the clock signal TS2DEL it receives. The time difference value DIF1 is essentially due to the transmission time of the clock signal TS1 from the module MOD1 to the module MOD2 and the transmission time of the clock signal TS2DEL from the module MOD2 to the module MOD1. Since the transmission paths between the modules MOD1 and MOD2 are equally long in the present case, the logic component CP1 halves the time difference value DIF1 and forms an item of correction information COR. The module MOD1 then transmits the correction information COR to the module MOD2, which adjusts its clock generator GEN2 with the correction information COR. The clock generator GEN2 then generates a clock signal TS2OPT that is synchronous with the clock signal TS1. If the transmission paths between the modules MOD1 and MOD2 are not equally long, the logic component CP1 may also use other, more complex algorithms to form the correction value COR1.

The correction information COR may contain, for example, a digitally encoded transmitted starting value or a resettable counter contained in the clock generator GEN2. It is also possible that the module MOD1 corrects the clock signal TS1 forward in phase by the halved time difference value DIF1 between the clock signal TS1 and the clock signal TS2DEL and transmits the clock signal TS1 "advanced" in this way as correction information COR to the module MOD2.

Furthermore, the module MOD1 may transmit the time difference value DIF1 between the clock signal TS1 and the clock signal TS2DEL also in unprocessed form, that is to say as correction information COR to the module MOD2 without the halving described above. The module MOD2 then halves the time difference value DIF1 and thus adjusts its clock generator GEN2. Furthermore, the module MOD2 may incorporate, for example, also an offset value in the correction information COR. Such an offset value may represent, for example, the time that the clock generator GEN2 requires for the adjustment operation or that the module MOD2 needs to receive and read in the correction value COR1.

Let the sequence shown in FIG. 2 be preceded by the synchronization shown on the basis of FIG. 1. The clock generators GEN1 and GEN2 generate clock signals TS1 and TS2, respectively, that are synchronous under optimum conditions, for example in the case of interference-free clock generators GEN1 and GEN2 operating in exactly the same way. The module MOD1 transmits the clock signal TS1 to the logic component CP2 of the module MOD2. Furthermore, the logic component CP2 receives the clock signal TS2 from the clock generator GEN2. From the clock signal TS1 delayed by the transmission from the module MOD1, and the local clock signal TS2, the logic component CP2 forms a time difference value DIF2 that, given synchronous clock signals TS1 and TS2, is equal to half the time difference value DIF1.

The module MOD2 transmits the time difference value DIF2 to the module MOD1 so that the latter can detect whether the clock signal TS2 is synchronous with the clock signal TS1. If this is not the case, the module MOD1 may initialize the synchronization operation shown on the basis of FIG. 1 again and/or signal the interference to a coordinating control for the modules MOD1 and MOD2.

In the present case, the logic component CP2 forms a correction value COR2 from the time difference value DIF2 and the time difference value DIF1 previously received and stored by it. In this connection, the logic component CP2 subtracts, for example, from the time difference value DIF2 half the time difference value DIF1. To form the correction value COR2, the logic component CP2 may also take into account further correction factors, for example a time that is needed to adjust the clock generator GEN2. The logic component CP2 supplies the correction value COR2 to the clock generator GEN2, which then adjusts itself again and, consequently, generates a clock signal TS20PT that is synchronous with the clock signal TS1.

Let the sequence shown in FIG. 3 also be preceded by the synchronization shown on the basis of FIG. 1. However, in FIG. 3, the clock signal TS2DEL generated by the clock generator GEN2 is no longer precisely synchronous with the clock signal TS1 since, for example, the module MOD2 had no power supply for a short time. The module MOD2 transmits the clock signal TS2DEL to the module MOD1. The clock signal TS2DEL arrives with a time shift due to the transmission. Given symmetrical transmission paths, said shift is equal, as explained on the basis of FIG. 1, to half the time difference value DF1. The module MOD1 therefore first corrects the received time signal TS2DEL by half the time difference value DIF1. Furthermore, the module MOD1 determines a time difference value DIF3 between the corrected clock signal TS2DEL and the clock signal TS1. The module MOD1 then sends an item of correction information COR2(DIF3) based on the time difference value DIF3 to the module MOD2 so that the latter can adjust its clock generator GEN2. The clock generator GEN2 then again generates a clock signal TS2OPT that is synchronous with the clock signal TS1.

As shown on the basis of FIGS. 2 and 3, the module MOD2 may also be repeatedly resynchronized during continuous operation so that phase deviations between the clock signals TS1 and TS2 that may creep in during operation are eliminated again.

In addition to the module MOD2, further modules, not shown, can also be synchronized by the module MOD1 in the manner explained. Furthermore, it is possible that the module MOD2 also synchronizes a module depending on it since the module MOD2 is, as explained, very precisely synchronized with the module MOD1. Not only "parallel circuits" can therefore be formed with a synchronizing module and a plurality of modules synchronized by it, but also cascaded arrangements.

FIG. 4 shows the modules MOD1 and MOD2 known from FIG. 1 and a further module MOD3 in which a control module CPU3, for example a signal processor, fulfills the functions of a clock generator (GEN1 or GEN2) and the functions of the logic component (CP1, CP2) triggering the clock generator. For this purpose, the control module CPU3 runs the program code of a slave program module designed according to the invention.

The module MOD1 transmits its clock signal TS1 via a transmitting module SND11 on a bus line BUSSND. From the latter, the module MOD2 receives the clock signal TS1 with the aid of a receiving module RCV21 and the module MOD3 receives it with the aid of a receiving module RCV31. The module MOD2 then synchronizes its clock generator GEN2 with the clock signal TS1. The module MOD3 also synchronizes with the clock signal TS1 and generates a clock signal TS3. However, the clock signals TS2 and TS3 are phase-shifted by the respective time intervals that the clock signal TS1 need for the transmission on the bus line BUSSND to the modules MOD2 and MOD3.

The module MOD2 transmits the clock signal TS2 with the aid of its transmitting module SND21 on a bus line BUSRCV for the module MOD1, which receives the clock signal TS2 with the aid of a receiving module RCV11. The logic component CP1 forms the correction information COR in a manner known from FIG. 1 and transmits it with the aid of a transmission module SND12 on a bus line CORX to the module MOD2. The latter receives the correction information COR with the aid of a receiving module RCV22 and adjusts its clock generator GEN2.

The module MOD3 sends the clock signal TS3 with the aid of a transmitting module SND31 on the bus line BUSRCV to the module MOD1. The logic component CP1 forms, in an analogous way as for the module MOD2, an item of correction information and transmits it via the transmission module SND12 to the module MOD3. The latter receives the correction information with the aid of a receiving module RCV32 and adjusts the clock generator function of its control module CPU3.

The receiving module RCV22 of the module MOD2 passes on the correction information COR also to the logic component CP2 so that the latter can, as explained on the basis of FIG. 2, generate, on the one hand, the correction value COR2 for the clock generator GEN2 for the purpose of adjusting it and, on the other hand, the time difference value DILF2 that a transmitting module SND22 sends on a bus line DTFX to the module MOD1.

The modules in FIG. 4 are differently configured to illustrated different design variants so that their mode of operation as synchronizing "master module, and also as "slave" modules (MOD2 and MOD3) to be synchronized emerges simply on the basis of the respective module construction and the respective mode of connection of the transmitting and receiving modules.

However, it is also possible that similar modules are used that can perform both a "slave" function and a "master" function. For example, not only a slave program module may be present, as explained, on the module MOD3, but also a master program module so that the module MOD3 may also act as synchronization "master".

Furthermore, the module MOD1 may also be constructed like the module MOD3 and have a processor for running a program code, but may contain, in contrast to module MOD3, a master program module that can perform the synchronization function explained above and, if necessary, also a synchronization monitoring function.

An eligibility to operate as "master module", that is to say an eligibility to synchronize one or more slave modules, may be permanently stipulated by, for example, configuring an interrogation contact, a so-called jumper, on the respective module in a suitable way. On the basis of the configuration of the jumper, the respective module can determine whether it is being used as master module or as slave module. However, provision may also be made that the respective function is determined dynamically, for example, by that module becoming the master module that is the first module to transmit its clock signal.

What is claimed is:

1. A method for internal synchronization of a first and at least a second module which are within a single telecommunication device, and each of which has a clock generator, the method comprising the steps of transmitting, by the first module, a first clock signal generated by its clock generator to the at least one second module, synchronizing the clock generator of the at least one second module with the first clock signal, transmitting, by the at least one second module, a second clock signal, generated by its clock generator, that is synchronized with the first clock signal to the first module, determining, by the first module, a first time difference value between the first clock signal and the at least one second clock signal, which time difference value is essentially due to the transmission time of the first and the at least one second clock signal between the first and the at least one second module, transmitting, by the first module, an item of information about the first time difference value to the at least one second module, and adjusting the clock generator of the at least one second module on the basis of the information about the first time difference value so that said first and second clock signals are synchronous, wherein the first time difference value is halved to adjust the clock generator of the at least one second module.

2. A method according to claim 1, wherein the at least one second module determines a second time difference value from the first and the second clock signal signal, and wherein the at least one second module transmits an item of information about the second time difference value to the first module.

3. A method according to claim 1, wherein the first module cyclically transmits the first clock signal, generated by its clock generator, to the at least one second module at predetermined instants in time.

4. A method according to claim 1, wherein the first module retransmits the first clock signal, generated by its clock generator, to the at least one second module at predetermined time intervals, wherein the at least one second module determines a second time difference value from the first and the second clock signal, and wherein the at least one second module transmits the respective second time difference value to the first module, and/or, if the respective second time difference value deviates from a predetermined value, said second module adjusts its clock generator on the basis of the respective second time difference value.

5. A method according to claim 1, wherein the at least one second module retransmits the second clock signal, generated by its clock generator, to the first module at predetermined time intervals, wherein the first module determines a first time difference value between the first clock signal and the respective second clock signal received, wherein, if the respective first time difference deviates from a predetermined value, the first module transmits an item of information, about the respective first time difference value, to the at least one second module, and wherein the at least one second module adjusts its clock generator on the basis of the information about the respective first time difference value.

6. The method according to claim 1, further comprising the step of transmitting said first and second clock signals via bus lines interconnecting said first and said at least second module.

7. The method according to claim 6, further comprising the steps of: providing said first and second modules as respective spaced-apart printed circuit boards; and providing said single telecommunication device as a telecommunication junction.

8. A first module having a first clock generator for internal synchronization with at least one second module having a second clock generator, said first and second modules being within a single telecommunication device, said first module comprising transmitting means for transmitting a first clock signal generated by the first clock generator to the at least one second module, receiving means for receiving at least one second clock signal generated by the respective second clock generator and synchronized with the first clock signal and transmitted by the at least one second module, and generating means for forming a first time difference value between the first clock signal and the at least one second clock signal, which time difference value is essentially due to the transmission time of the first and of the at least one second clock signal between the first and the at least one second module, wherein the transmitting means are designed for sending an item of information about the first time difference value to the at least one second module.

9. The first module according to claim 8, wherein said first and second modules are respective spaced-apart printed circuit boards that are interconnected by bus lines via which said first and second clock signals are transmitted.

10. A second module having a clock generator for internal synchronization with at least one first module, said first and second modules being within a single telecommunication device, said second module comprising receiving means for receiving a first clock signal sent by the first module, synchronizing means for synchronizing its clock generator on the basis of the first clock signal, and transmitting means for sending a second clock signal synchronized with the first clock signal to the first module, wherein the receiving means are designed for receiving an item of information sent by the first module about a first time difference value formed from the first clock signal and the second clock signal, which time difference value is essentially due to the transmission time of the first and of the at least one second clock signal between the first and the at least one second module, and wherein the synchronizing means are designed for adjusting the clock generator on the basis of the information about the first time difference value.

11. The second module according to claim 10, wherein said first and second modules are respective spaced-apart printed circuit boards that are interconnected by bus lines via which said first and second clock signals are sent.

12. A master program module for a first module having a first clock generator for internal synchronization with at least one second module having a second clock generator, wherein the first and second modules are within a single telecommunication device, and wherein the master program module contains a program code that can be run by a control means of the first module, the master program module further comprising transmitting means for sending a first clock signal generated by the first clock generator to the at least one second module, receiving means for receiving at least one second clock signal generated by the second clock generator that is synchronized with the first clock signal and sent by the at least one second module, and generating means for forming a first time difference value between first clock signal and the at least one second clock signal, which time difference value is essentially due to the transmission time of the first and of the at least one second clock generator between the first and the at least one second module, wherein the transmitting means are designed for sending an item of information about the first time difference value to the at least one second module.

13. A computer-readable diskette storing a master program module according to claim 12.

14. The master program module according to claim 12, wherein said first and second modules are respective spaced-apart printed circuit boards that are interconnected by bus lines via which said first and second clock signals are sent.

15. A slave program module for a second module having a clock generator for internal synchronization with at least one first module, wherein the first and second modules are within a single telecommunication device, and wherein the slave program module contains a program code that can be run by a control means of the second module, the slave program module further comprising receiving means for receiving a first clock signal sent by the first module, synchronizing means for synchronizing the clock generator on the basis of the first clock signal, and transmitting means for sending a second clock signal synchronized with the first clock signal to the first module, wherein the receiving means are designed to receive an item of information transmitted by the first module about a first time difference value formed from the first clock signal and the second clock signal, which time difference value is essentially due to the transmission time of the first and of the at least one second clock signal between the first and the at least one second module, and wherein the synchronizing means are designed to adjust the clock generator on the basis of the information about the first time difference value.

16. A computer readable diskette storing a slave program module according to claim 15.

17. The slave program module according to claim 15, wherein said first and second modules are respective spaced-apart printed circuit boards that are interconnected by bus lines via which said first and second clock signals are sent.

18. A device containing therein at least one first and at least one second module, each having a clock generator, wherein the at least one first module comprises transmitting means for transmitting a first clock signal, generated by the first clock generator, to the at least one second module, receiving means for receiving at least one second clock signal generated by the respective second clock generator and synchronized with the first clock signal and transmitted by the at least one second module, and generating means for forming a first time difference value between the first clock signal and the at least one second clock signal, which time difference value is essentially due to the transmission time of the first and of the at least one second clock signal between the first and the at least one second module, wherein the transmitting means are designed for sending an item of information about the first time difference value to the at least one second module, and wherein the at least one second module comprises receiving means for receiving a first clock signal sent by the first module, synchronizing means for synchronizing its clock generator on the basis of the first clock signal, and transmitting means for sending a second clock signal, synchronized with the first clock signal, to the first module, wherein the receiving means are designed for receiving an item of information sent by the first module about a first time difference value formed from the first clock signal and the second clock signal, which time difference value is essentially due to the transmission time of the first and of the at least one second clock signal between the first and the at least one second module, wherein the synchronizing means are designed for adjusting the clock generator of said second module on the basis of the information about the first time difference value, and wherein the first time difference value is halved to adjust the clock generator of the at least one second module.

19. The device according to claim 18, wherein said first and second modules are respective spaced-apart printed circuit boards that are interconnected by bus lines via which said first and second clock signals are transmitted.

* * * * *